United States Patent [19]
Katzensteiner

[11] Patent Number: 5,211,406
[45] Date of Patent: May 18, 1993

[54] SEALING-MODULAR CONSTRUCTION

[75] Inventor: Josef R. Katzensteiner, Passau, Fed. Rep. of Germany

[73] Assignee: Zahnradfabrik Friedrichshafen AG, Fed. Rep. of Germany

[21] Appl. No.: 712,983

[22] Filed: Jun. 10, 1991

[30] Foreign Application Priority Data

Jul. 25, 1990 [DE] Fed. Rep. of Germany ....... 4023630

[51] Int. Cl.$^5$ .............................................. F16J 15/32
[52] U.S. Cl. ....................................... 277/25; 277/37; 277/53; 277/70; 277/133; 277/153
[58] Field of Search .................... 277/35, 37, 38, 53, 277/58, 65, 152, 153, 25, 133, 70; 384/486

[56] References Cited

U.S. PATENT DOCUMENTS

| 2,736,583 | 2/1956 | Marvin | 277/153 |
| 3,021,161 | 2/1962 | Rhoads et al. | 277/37 |
| 3,099,454 | 7/1963 | Walinski | 277/153 X |
| 3,135,518 | 6/1964 | Carson et al. | 277/37 |
| 3,341,265 | 9/1967 | Paterson | 277/37 X |
| 3,356,376 | 12/1967 | Bradfate et al. | 277/37 |
| 4,208,057 | 6/1980 | Messenger | 277/37 |
| 4,696,479 | 9/1987 | Karcher | 277/38 |
| 4,936,591 | 6/1990 | Romero | 277/37 X |
| 4,981,303 | 1/1991 | Matsushima et al. | 277/37 |
| 5,004,248 | 4/1991 | Messenger et al. | 277/153 X |
| 5,022,659 | 6/1991 | Otto | 277/152 X |

FOREIGN PATENT DOCUMENTS

| 703022 | 2/1965 | Canada | 277/37 |
| 881607 | 11/1961 | United Kingdom . | |
| 2136891 | 9/1984 | United Kingdom | 384/486 |

Primary Examiner—Allan N. Shoap
Attorney, Agent, or Firm—Davis, Bujold & Streck

[57] ABSTRACT

The invention concerns a sealing arrangement in modular construction. In order to make the sealing arrangement (1) capable of fording, there is an internal sealing set (5) consisting of a radial shaft sealing ring (6) having two spring-loaded sealing lips (7, 8). The proposed sealing arrangement is specially adequate for use in axles of vehicles employed in agriculture and construction which in practical use are exposed to the most unfavorable conditions.

5 Claims, 1 Drawing Sheet

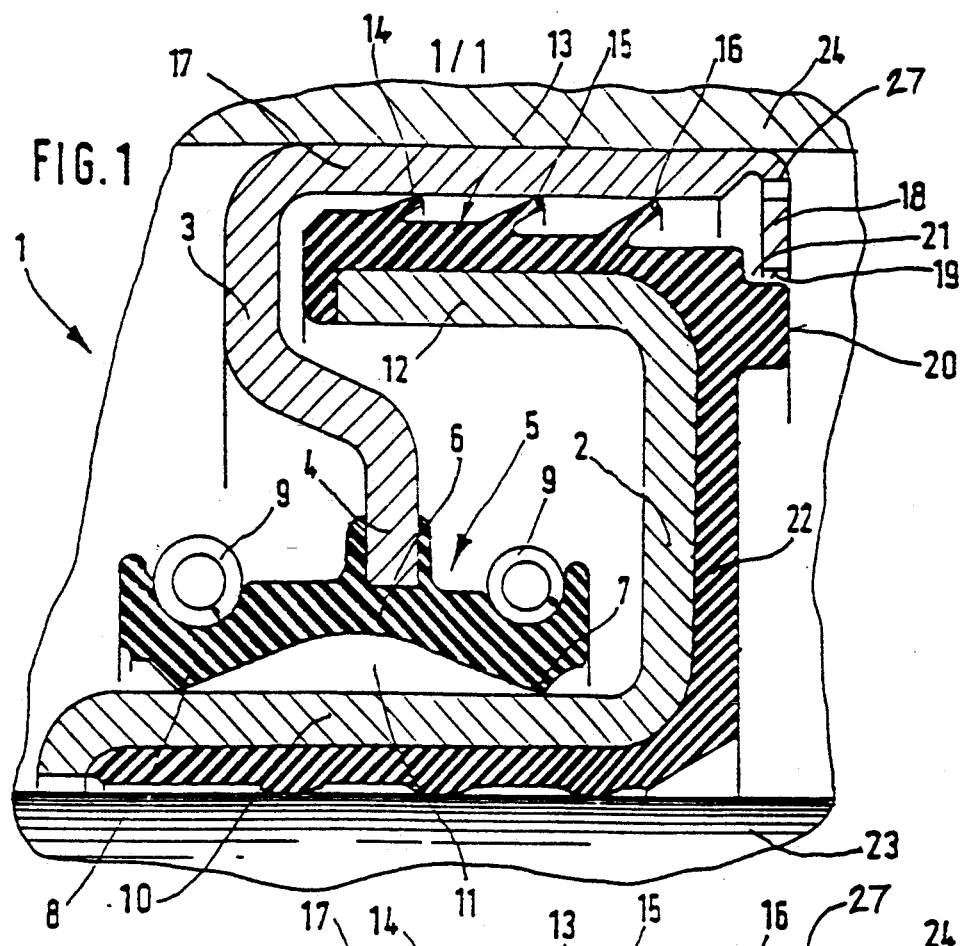
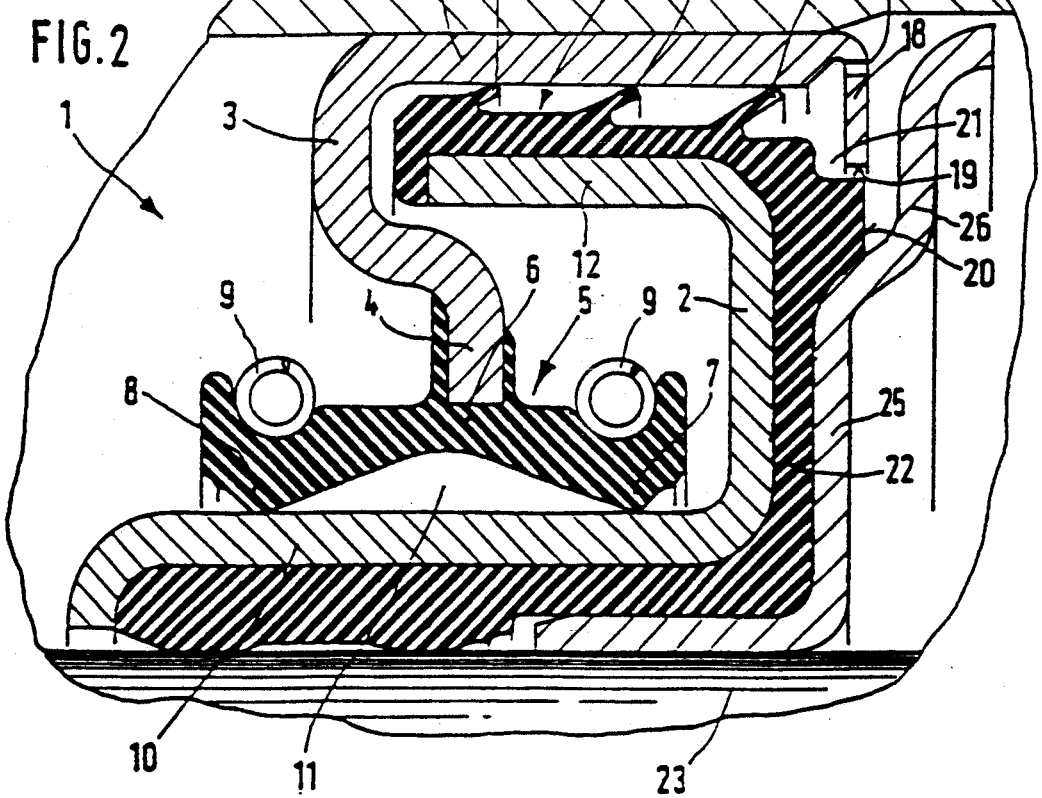

SEALING-MODULAR CONSTRUCTION

The invention concerns a sealing arrangement of a modular construction having an internal and external annular housing of substantially U-shaped cross-section and relatively rotatable with respect to each other, a first internal sealing set and a second external sealing set each having at least one sealing lip and each closely abutting against axially pointed portions of the annular housing.

A sealing arrangement of modular construction of the kind mentioned above has been disclosed, for instance, in British Patent 881,607. In one embodiment of this reference (FIG. 8), the external annular housing of the sealing arrangement has a radially inwardly pointed web at the end of which is secured a protective lip and, axially spaced, a spring-loaded sealing ring. Said radial shaft sealing ring takes care of the sealing toward the oil side. The sealing arrangement already known has the disadvantage of lacking fording capacity. By creating a sealing arrangement having fording capacity produces a sealing arrangement which can be used under difficult external conditions, especially in wet, muddy terrain. Such difficult conditions of use are to be encountered, for instance, in agricultural harvesters.

The invention is based on the problem of developing a sealing arrangement in modular construction of the kind mentioned above so that it has fording capacity, that is, it can be used specially in wet, muddy terrain with an acceptable life span.

The problem upon which the invention is based is solved by the fact that the internal sealing set consists of a radial shaft sealing ring with two spring-loaded sealing lips. While in the sealing arrangements of the prior art (British Patent 881,607, French Patent 25 27 297, EP 01 16 721 B1) there is provided the use of a spring-loaded sealing ring in combination with several front-mounted protective lips; the sealing arrangement according to the present invention, however, reverts back to the use of an already known radial shaft sealing ring. Eliminated here is the protective lip, which in the arrangements of the prior art, is mounted on the dirt side in front of the—only—sealing lip. Comparison tests have shown that a comparatively long life can be obtained with the proposed sealing arrangement.

It is specially advantageous if the sealing lips are situated on both sides of a radially inwardly pointed web of the external annular housing. In this manner the spring-loaded sealing lips can be situated on the web, for instance, mirror-inverted.

In order to improve the protection of the external sealing set, which can be formed, for instance, of three protective lips, it is provided, that in a sealing arrangement having a radially inwardly pointed flange of the external annular housing, that the internal edge of the flange and a ring of the internal housing form a labyrinth. By virtue of the labyrinth facing the dirt side, coarse impurities are kept away from the external sealing set.

It is functionally advantageous to coat the internal housing with a rubber elastic external shell. The internal, axially pointed portion of said external shell takes care of fixing the internal housing of the sealing arrangement upon the rotating component. In the area of the flange the external shell is shaped so as to form the ring which is a component part of the labyrinth. The outwardly pointing protective lips which extend diagonally inclined are integrated on the external portion of the external shell.

According to another advantageous feature, the labyrinth is additionally shielded by a disc that rotates with the internal housing. The disc repels coarse impurities and keeps them away from the labyrinth and the consecutive protective lips.

From the description that follows of two embodiments of the sealing arrangement according to the invention, there can be deduced other features essential to the invention and the advantages resulting therefrom. In the drawings:

FIG. 1 is a sealing arrangement in modular construction in longitudinal cross-section; and FIG. 2 is a sealing arrangement according to FIG. 1 modified in details.

A simplified and full scale enlargement of a sealing arrangement 1 is shown in FIG. 1 partly in longitudinal cross-section, consisting of the first place of an internal annular housing 2 and an external annular housing 3. The internal and external annular housings 2 and 3 each have a substantially U-shaped cross-section. The external housing 3 surrounds the internal housing 2 in the manner of a cassette. The external annular housing 3 has a radially inwardly pointed (extending) web 4 to which is fastened a first, internal sealing set 5. Depending on the nature of the material of the internal sealing set 5, the fastening can be obtained by a spraying or vulcanization operation. The internal sealing set 5 consists of a radial shaft sealing ring 6 having two spring-loaded sealing lips 7 and 8. Tension springs 9 are provided for resilient flexible loading of the sealing lips 7 and 8. The sealing lips 7 and 8 closely abut on an internal, axially pointed (extending) portion 10 of the internal annular housing 2. The space 11 between the sealing lips 7 and 8 is filled with grease of an elevated dropping point.

The internal annular housing 2 has an external, axially pointed (extending) portion 12. A second, external sealing set 13 is fastened to said portion 12. The external sealing set 13 has in this case three protective lips 14, 15 and 16. The protective lips 14, 15 and 16 extend diagonally, outwardly pointing, and abut radially on an external axially pointed portion 17 of the external annular housing 3.

The axially pointed (extending) portion 17 changes over to a flange 18 which is radially inwardly pointed (extending). An internal edge 19 of the flange 18 forms with a ring 20 of the internal housing 2 a labyrinth 21. Said labyrinth 21 is front-mounted on the protective lips 16, 15 and 14. The external sealing set 13 with the protective lips 14, 15 and 16 and the ring 20 are component parts of a rubber elastic external shell 22 of the internal housing 2.

The external shell 22 fixes the axially pointed portion 10 of the internal housing 2 on a rotating component such as a drive shaft 23.

The axially pointed (extending) portion 17 of the external housing 3 is compressed into a bore of a housing such as a fork housing 24 of an axle which is not shown. It is irrelevant, however, whether—as in the instant embodiment—the component 23 rotates while the component 24 stands still. The conditions can also be reversed, since what matters is only the relative rotatability of the housings 2 and 3 with respect to each other. If the sealing arrangement 1 is incorporated in a wheel bearing, the wheel hub is the rotating component, while the hub carrier stands still.

The side of the sealing arrangement 1 which in the drawing appears to the right is the so-called dirt side. External influences, such as moisture, mud, cold or the like, act from this side upon the sealing arrangement 1. The side of the sealing arrangement 1 which in the drawing appears to the left is the so-called oil side. On this side, the sealing arrangement 1 faces a space filled at least partly with oil.

The dirt side can be, for instance, the open internal space of a fork housing of a steering axle of an agriculturally used vehicle. The oil side can in this case be formed by the internal space of a stepdown gearing.

The sealing arrangement shown in FIG. 2 corresponds substantially to the one of FIG. 1. Therefore, the same components have the same reference numerals. In this embodiment, a disc 25 is coordinated with the sealing arrangement 1. The disc 25 is non-rotatably connected with the drive shaft 23. The disc 25 acts as a centrifugal disc by means of a dished edge 26 and keeps coarse impurities away from the labyrinth 21 of the sealing arrangement.

The treads (external shell of the portion 10 or internal shell of the portion 17) can be individually surface-treated, such as ground or radiated. The sealing lip(s) 7 and/or 8 and/or protective lips 14, 15, 16 can be made of different materials. The protective lips 14, 15, 16 can be made, for instance, of material specially resistant to water. It is advantageous to at least make the sealing lip 8 of oil-resistant (hypoid oil) material.

The sealing lips 7 and 8 can have different internal diameters. It is advantageous to select a smaller inner diameter of the sealing lip 8 as compared to the inner diameter of the sealing lip 7 in order to facilitate the assembly of the radial shaft sealing ring 6. It is particularly advantageous to provide the flange with a few (small) openings 27 (such as bores). Said openings make a complete discharge of water from the area in front of the protective lip 16 possible. In this manner a fast freezing of the sealing arrangement, in particular, is reliably prevented.

Reference Numerals

1: sealing arrangement
2: internal annular housing
3: external annular housing
4: web
5: internal sealing set
6: radial shaft sealing ring
7: sealing lip
8: sealing lip
9: tension spring
10: axially pointed portion
11: space
12: axially pointed portion
13: external sealing set
14: protective lip
15: protective lip
16: protective lip
17: axially pointed portion
18: flange
19: internal edge
20: ring
21: labyrinth
22: external shell
23: drive shaft
24: fork housing
25: disc
26: dished edge

I claim:

1. A sealing arrangement (1) of a modular construction having an internal annular housing (2) and an external annular housing (3) which are rotatable relatively to one other, both said internal (2) and said external annular housings (3) having a substantially U-shaped cross-section, an internal sealing set (5) and an external sealing set (13) each being supported by one of said internal and external annular housings (2, 3) and each sealing set (5, 13) having at least one sealing lip (7, 14) closely abutting against an axially extending portion (10, 17) of the other of said internal and external annular housings (2, 3), wherein said external annular housing (3) has a radially inwardly extending web (4) and said internal sealing set (5) comprising a radial shaft sealing ring (6) having two spring-loaded sealing lips (7, 8), and one of said two spring-loaded sealing lips (7, 8) is situated on each side of said radially inwardly extending web (4), and said external annular housing (3) includes a radially inwardly extending flange (18), and a radially inward edge (19) of said flange (18) and an exterior portion of a ring (20) supported by said internal housing (2) forming a labyrinth (21) therebetween.

2. A sealing arrangement according to claim 1, said ring (20) is a component part of a rubber elastic external shell (212) supported by said internal annular housing (2).

3. A sealing arrangement according to claim 1, wherein said labyrinth (21) is shielded by a disc (25) that rotates with said internal annular housing (2).

4. A sealing arrangement according to claim 1, wherein said external annular housing is provided with opening means for allowing water which may collect within said external annular housing to be discharged.

5. A sealing arrangement according to claim 1, wherein said sealing set (13) is provided with three sequentially arranged sealing lips (14, 15, 16) closely abutting against the axially extending portion (17) of said external annular housings (3).

* * * * *